United States Patent
Crinon et al.

(10) Patent No.: US 7,904,933 B2
(45) Date of Patent: Mar. 8, 2011

(54) GENERATING AND MANAGING DTV APPLICATION SIGNALING BASED ON ASSET DEFINITION

(75) Inventors: Regis J. Crinon, Camas, WA (US); Akash Pai, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 10/716,998

(22) Filed: Nov. 19, 2003

(65) Prior Publication Data

US 2005/0108772 A1    May 19, 2005

(51) Int. Cl.
*H04N 7/16* (2011.01)
(52) U.S. Cl. .......................... 725/138; 725/135
(58) Field of Classification Search .............. 725/138
See application file for complete search history.

(56) References Cited

U.S. PATENT DOCUMENTS

| | | | |
|---|---|---|---|
| 6,484,199 B2* | 11/2002 | Eyal | 709/223 |
| 7,165,264 B1* | 1/2007 | Westrick | 725/40 |
| 2003/0028899 A1* | 2/2003 | MacInnis | 725/132 |
| 2004/0015998 A1* | 1/2004 | Bokor et al. | 725/136 |
| 2004/0015999 A1* | 1/2004 | Carlucci et al. | 725/136 |
| 2004/0025181 A1* | 2/2004 | Addington et al. | 725/58 |
| 2005/0022122 A1* | 1/2005 | Barrus et al. | 715/530 |

\* cited by examiner

*Primary Examiner* — Brian T Pendleton
*Assistant Examiner* — Olugbenga Idowu
(74) *Attorney, Agent, or Firm* — Lee & Hayes, PLLC

(57) ABSTRACT

An implementation is described herein that generally pertains to digital video television technology. At least one implementation, described herein, provides an asset definition framework for digital television (DTV) managed applications. This abstract itself is not intended to limit the scope of this patent. The scope of the present invention is pointed out in the appending claims.

8 Claims, 3 Drawing Sheets

GENERATING AND MANAGING DTV APPLICATION SIGNALING BASED ON ASSET DEFINITION

TECHNICAL FIELD

This invention generally pertains to digital video television technology.

BACKGROUND

It is typical for a provider of multimedia content to provide multimedia content to a digital television (DTV) cable headend facility. Such a headend facility is a control center of a DTV cable system, where incoming signals are amplified, converted, processed, and combined into a common cable for transmission to customers.

Indeed some standards have been developed for a multimedia content provider to effectively interface with a headend facility for each multimedia asset (e.g., a movie) that it receives. For example, such standards have been developed for providers of video-on-demand (VOD) and subscription VOD assets to interface with headend facilities.

In particular, an organization called CABLELABS™ has developed an Asset Definition Interface (ADI) for VOD and subscription VOD. CABLELABS (Cable Television Laboratories, Inc.) is a non-profit research and development consortium of the cable television industry.

Its VOD ADI defines a standard interface that allows multimedia content providers to communicate VOD assets and information about these VOD assets into a cable headend facility. VOD assets include the multimedia content (e.g., movies). "Metadata" is included in the asset descriptor provided by the ADI. That includes content metadata, rights metadata, content identification, operational information, and business/pricing metadata.

Generally, metadata is data about data. Typically, metadata describes how and when and by whom a particular set of data was collected, and how the data formatted.

However, no standard interface has been developed for providers of other types of assets to effectively and easily communicate to a cable headend facilities and then ultimately to the user of such a headend.

SUMMARY

An implementation is described herein that generally pertains to digital video television technology. At least one implementation, described herein, provides an asset definition framework for digital television (DTV) managed applications.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1:
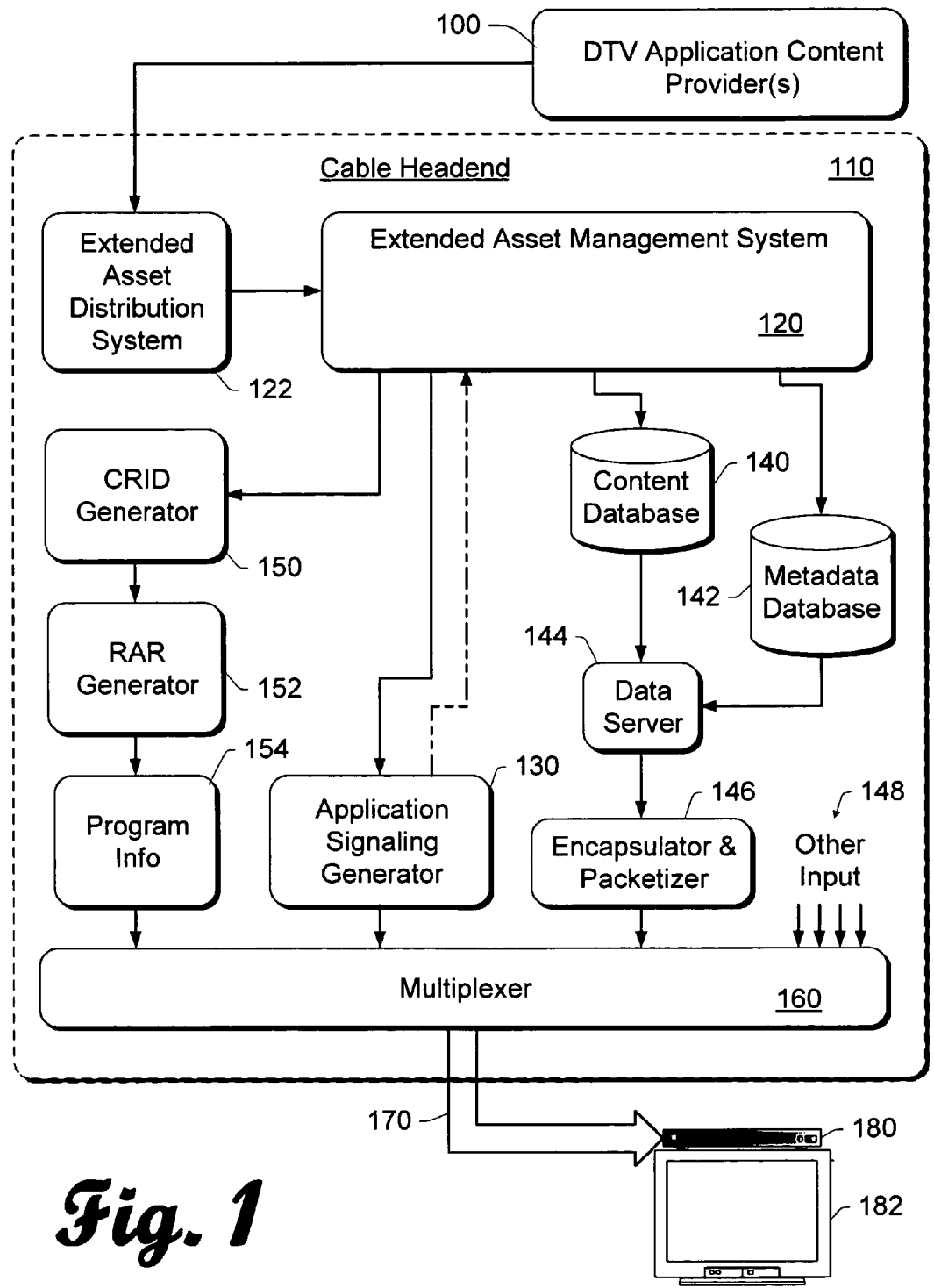
FIG. 1 is a block diagram of a system and a suitable environment, in accordance with an implementation described herein.

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Generating and Managing DTV Application Signaling based on Asset Definition that incorporates elements recited in the appended claims. These implementations are described with specificity in order to meet statutory written description, enabling and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

An example of an embodiment of a Generating and Managing DTV Application Signaling based on Asset Definition may be referred to as an "exemplary application-signal generator and manager."

Introduction

The exemplary application-signal generator and manager provides an asset definition framework for digital television (DTV) managed applications. A DTV managed application is a program module having processor-executable instructions that are executed on a DTV receiver (e.g., a set-top box or a cable-ready DTV set) and sent by a DTV application provider. An example of such an application is video games. Other examples include interactive television assets such as "walled gardens" (which is a browsing environment that controls the information that a user is able to access) or graphics overlaid over the video content.

This asset definition of the exemplary application-signal generator and manager allows content providers to deliver DTV applications and metadata associated with each of these managed applications to a cable headend. In addition, it enables content providers to drive the data insertion equipment of the cable headend. This asset definition of the exemplary application-signal generator and manager may be used to generate the application signaling used by receivers to discover and launch applications at the receiver.

The asset definition of the exemplary application-signal generator and manager includes a metadata set that facilitates the content provider's efficient delivery of DTV managed applications and their associated metadata to a cable headend. The format of metadata may be XML or any other suitable format. The metadata extensions are chosen to facilitate automatic management and generation of the Application Signaling data that a cable headend needs to produce and transmit to DTV receivers.

Exemplary Application-Signal Generator and Manager

FIG. 1 illustrates an exemplary environment in which the techniques, systems, and other aspects described herein may be implemented (partially or wholly). Exemplary environment is a television entertainment system that facilitates distribution of digital television (DTV) assets (such as multimedia content and application content).

The environment includes one or more digital television (DTV) Application Content Provider(s) 100, a Content Distribution System 110, and one or more DTV receiver units 180 coupled to the Content Distribution System 110 via a network 170 (such as a broadcast network).

Network 170 can include a cable television network, RF, microwave, satellite, and/or data network, such as the Internet, and may also include wired or wireless media using any multicast format or multicast protocol. Additionally, network 170 may be any type of network, using any type of network topology and any network communication protocol, and may be represented or otherwise implemented as a combination of two or more networks.

The DTV receiver unit 180 may be referred to as a set-top box. The unit is typically coupled to a presentation device 182 (such as a television).

In FIG. 1, solid-line arrows denote data flows and dash-dot-line arrows denote control message flows.

The DTV Application Content Provider 100 typically includes stored application content (such as video games and "walled garden" browsing environments). The DTV Application Content Provider 100 may also include data related to real-time interactions (such as live on-line gaming with other users).

The exemplary application-signal generator and manager may be employed as part of the Content Distribution System 110. Content distribution system 110 is representative of a "cable headend" facility that provides application content to multiple subscribers. The Content distribution system 110 typically includes various types of equipment, such as antennas, preamplifiers, frequency converters, demodulators, modulators, processors, and other related equipment.

Using the metadata supplied by the Application Content Provider(s) 100 drives the data insertion equipment at the Content distribution system 110. Application signaling information is used by the DTV receiver units 180 to discover and launch the execution of applications.

The Content Distribution System 110 distribution system may include the following: an Extended Asset Management System 120, an Extended Asset Distribution System 122, an Application Signaling Generator 130, a Content database 140, a Metadata database 142, and a Data Server 144, an Encapsulator & Packetizer 146, Other input 148, a CRID generator 150, a Regulation Authority Records Generator 152, a Program Information Interface 154, and a Multiplexer 160.

The Extended Asset Distribution System 122 is communicatively coupled to the DTV Application Content Provider 100. From the provider, the Extended Asset Distribution System 122 receives application metadata along with the application content (e.g., program modules and application data). It receives the metadata and content using an Extended Asset Definition Interface (EADI). The details of the EADI are provided in Table 2 below.

The Extended Asset Distribution System 122 provides the application metadata and content from the DTV Application Content Provider 100 to the Extended Asset Management System 120. That system stores the metadata and the content in their respective Metadata and Content Databases (140 and 142).

The Extended Asset Management System 120 maintain logical bindings between the application content and its metadata. The Asset Manager System delivers the metadata to the Application Signaling Generator 130. The control line between the Asset Management System and the Application Signaling Generator allows the Asset Management System to inform the Generator of changes (such as metadata version changes).

The Application Signaling Generator 130 uses the EADI metadata information to generate an Application Information Table (AIT) defined by digital video broadcasting (DVB) to convey application signaling information for the DTV receiver units 180. The generator generates the AIT and also formats the table into a format that may be communicated to the DTV receiver units 180. For example, the generator may packetize the AIT into a sequence of MPEG-2 Transport Stream packets delivered to the Multiplexer 160.

The exemplary application-signal generator and manager may employ an interface for using an unambiguous resource identifier. The Content Referencing IDentifier (CRID) Generator 150 may be such an interface. In general, a CRID is a universal referencing identifier that is independent of time and location of the actual content. An example is the CRID defined by the "TV-Anytime" consortium.

The CRID Generator 150 may produce a "provider ID" and an "asset ID" that unambiguously identifies a particular application. The CRID may be as simple as: CRID://<providerID>/<AssetID>. The Registration Authority Records (RAR) Generator 152 may register authority records (in accordance with an authority, such as DVB) so that the DTV receiver units 180 can resolve the CRID references properly into meaningful locations for the content in the Transport Stream carried over the network 170. The Program Information System 154 communicates the CRIDs and RARs as part of the electronic program guide (EPG) data.

Meanwhile, the Data Server 144 collects data and possibly other metadata to construct a DTV data service transmission. That includes a transmission of the application code, application input data, and application metadata. The data is supplied to the Encapsulator & Packetizer 146 (for example, an MPEG-2 DSM-CC Object Carousel generator) producing transport stream packets (such as those for MPEG-2). The packets are then passed to the Multiplexer 160.

The Multiplexer 160 receives and multiplexes multiple inputs for transmission over the network 170 to the one or more DTV receiver units 180. Such input may be received from the Program Information System 154, Application Signaling Generator 130, the Encapsulator & Packetizer 146, and other inputs 148.

Other inputs may be from components of the Content Distribution System 110 which are not shown in FIG. 1. Those components may include the System Information generator and the Audio and Video Elementary Stream inputs. Those components may be resource management components and bandwidth provisioning/control equipment needed to drive the insertion policies into the Multiplexer 160.

Extended Asset Definition Interface

The Extended Asset Definition Interface (EADI) includes the application metadata. It is defined to correspond to the information the Application Signaling Generator 130 needs to produce the relevant information for DTV receiver units 180.

The metadata of the exemplary application-signal generator and manager is shown in the table below:

TABLE 1

Managed App Metadata Attributes

| Name | Description | Type | Required/Optional |
|---|---|---|---|
| AssetName, Provider, Product, VersionNumber, Description, CreationDate, ProviderID, AssetID, AssetType, ExternalAssetID | AssetType, expected value is "ManagedApp" (this defines the asset as an application running on a virtual machine) AssetName corresponds to the name of the application in the database | String | Required (except ExternalAssetID) |

TABLE 2

Managed App Metadata Extension Attributes

| Name | Description | Type | Required/Optional |
|---|---|---|---|
| AppID | Application ID. This is the identifier for the application that appears in the AIT. This field is used by DTV receivers to identify the application unambiguously | String | Required |
| OrgID | Organization ID. This is the identifier for the organization providing the application. The value of appID is scoped by the value of orgID so each organization can manage its appID value set independently of others. The value of this field is managed by DVB | String | Required |
| ApplicationType | Type of the application as signaled in the OCAP Application Signaling Framework. This field identifies the type of application and in particular, specifies the run-time environment needed in the DTV receiver to run he application. The value of this field is managed by DVB | String | Required |
| ProfileEncoding | OCAP (OpenCable Application Platform) specification field denoting the minimum profile on which the application will run. Possible string values are: EnhancedBroadcastProfile1" and "InteractiveBroadcastProfile1". The former for one-way applications and latter for 2 way applications. | String | Optional |
| Visibility | OCAP required field indicating the amount of control the end-user has over the application. There are two levels of control, "VisibilityThroughListingAPIs"—information about this application is available to other apps in the system and "VisibilityThroughEPG"—the application can be made visible through the EPG. The values in these fields are translated to the "visibility" field in AIT. Recommended default value is to make the application visible "VisibilityThrougListingAPIs-VisibilityThroughEPG" Possible values are: 1. "NoVisibilityThroughListingAPIs-NoVisibilityThroughEPG" 2. "VisibilityThrougListingAPIs-NoVisibilityThroughEPG" 3. "VisibilityThrougListingAPIs-VisibilityThroughEPG" | String | Required |
| Permission | This field is used to denote "sandbox" security permissions, which are those permissions related to the access, manipulation, and changes granted to the viewer for that application. | String | Optional |
| Rating | TV Rating. | String | Required |

The following is an example of an application and its metadata using the EADI (like that defined above):

```
<ASSET> <!-START OF MANAGED APP ASSET --!/>
    <METADATA <!-START OF MANAGED APPS ASSET METADATA --!/>
    PROVIDER="COMPANY"
        ASSETTYPE="MANAGEDAPP" <!-NOTE THE VALUE OF ASSETTYPE
--!>
    ASSETNAME="SOLITAIRE"
    ... ALL METADATA ATTRIBUTES
/> <!- END OF MANAGED APP ASSET METADATA --!/>
<METADATAEXTENSION <!-START MANAGED APP ASSET METADATAEXTENSION-
!/>
ORGID ="1F"
APPID ="3"
APPLICATIONTYPE = "OCAP-CLI"
PERMISSION ="PAUSE"
PERMISSION ="RETURN_PATH"
VISIBILITY =" VISIBILITYTHROUGLISTINGAPIS-VISIBILITYTHROUGHEPG"
/> <!-- END MANAGED APPS ASSET METADATAEXTENSION --!/>
<CONTENT> GAME.EXE </CONTENT>
<ASSET> <!-START OF SUPPORT FILE ASSET --!/>
<METADATA
    PROVIDER="COMPANY"
        ASSETTYPE="SUPPORT FILE" <!-NOTE THE VALUE OF
ASSETTYPE --!>
    ASSETNAME="SUPPORTINGTEXTFILE"
    ... ALL METADATA ATTRIBUTES
/>
<CONTENT> SUPPORT\FILE.TXT </CONTENT>
    </ASSET> <!-END OF SUPPORT FILE ASSET METADATA --!/>
</ASSET> <!-END OF MANAGED APP ASSET METADATA --!/>
```

Figure 2:
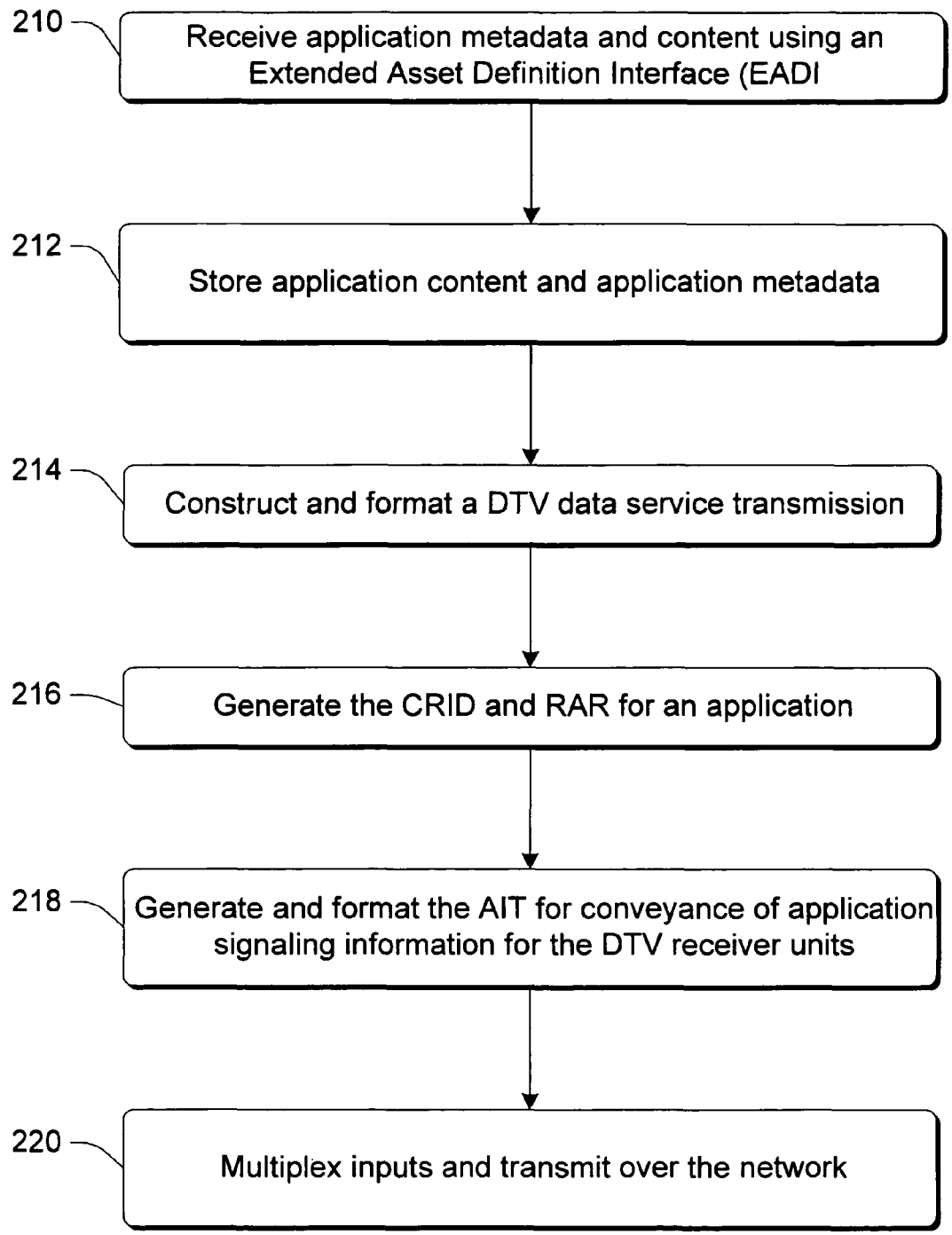
FIG. 2 is a flow diagram showing a methodological implementation described herein.

Methodological Implementations of the Exemplary Application-Signal Generator and Manager FIG. 2 shows a methodological implementation of the exemplary application-signal generator and manager. These methodological implementations may be performed in software, hardware, or a combination thereof.

At 210 of FIG. 2, via the Extended Asset Distribution System 122, the Extended Asset Management System 120 receives application metadata and content from DTV Application Content Provider 100. It receives the metadata and content using an Extended Asset Definition Interface (EADI). The details of the EADI are provided in Table 2 above.

At 212, the Extended Asset Management System 120 stores application content in the Content Database 140 and application metadata in the Metadata Database 142.

At 214, the Data Server 144 collects data and possibly other metadata to construct a DTV data service transmission and the Encapsulator & Packetizer produces transport stream packets to send the transmission over the network 170.

At 216, using the metadata associated with a particular application content, CRID Generator 150 and RAR Generator 152 generate the CRID and RAR.

At 218 of FIG. 2, using the EADI metadata information for an application, the Application Signaling Generator 130 generates and formats a data grouping for conveyance of application signaling information for the DTV receiver units 180. An Application Information Table (AIT) defined by digital video broadcasting (DVB) is an example of such a data grouping. This data in the data grouping is based on the EADI metadata information (details of which are provided in Table 2 above) and may include (for example): AppID, OrgID, ApplicationType, ProfileEncoding, Visibility. Permission, and Rating.

At 220, the Multiplexer 160 receives and multiplexes multiple inputs for transmission over the network 170 to the one or more DTV receiver units 180. Such transmission includes an application signal based upon the EADI metadata information for an application.

Figure 3:
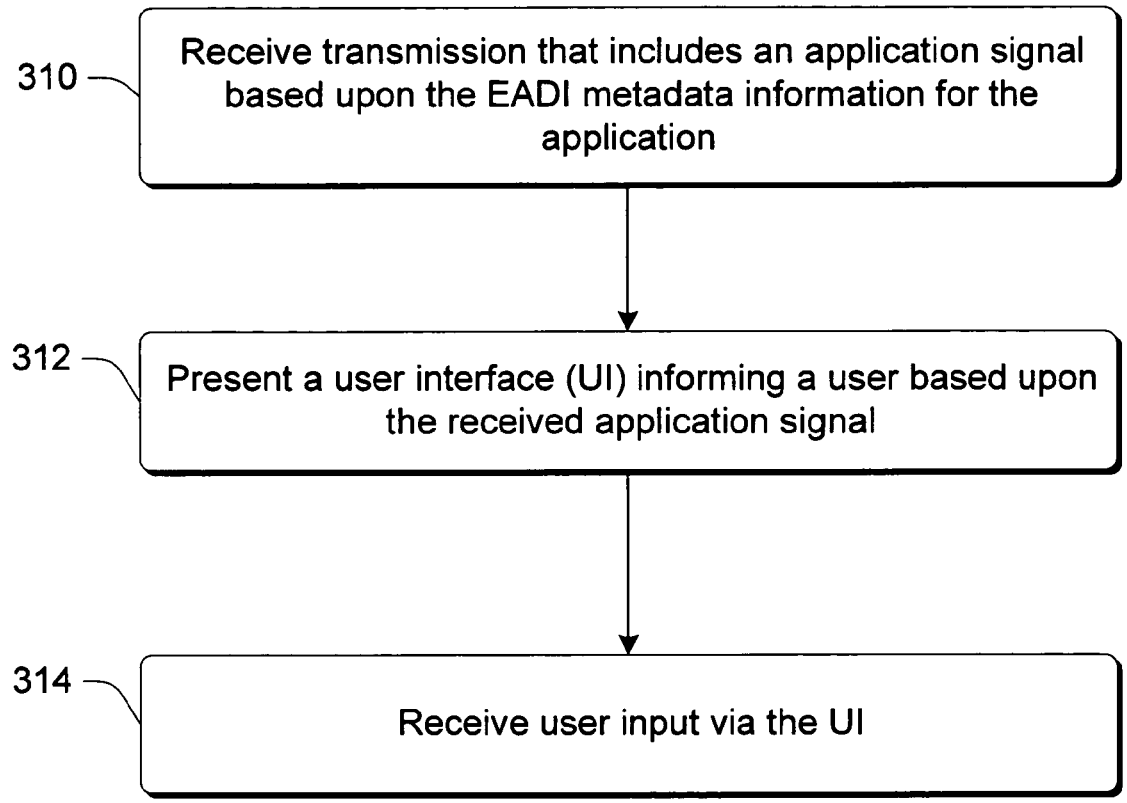
FIG. 3 is a flow diagram showing a methodological implementation described herein.

Methodological Implementations of a Receiving Unit of System using an Exemplary Application-Sipnal Generator and Manager FIG. 3 shows a methodological implementation of a receiving unit of a system using the exemplary application-signal generator and manager. These methodological implementations may be performed in software, hardware, or a combination thereof.

At 310 of FIG. 3, a receiving unit 180 receives transmission that includes an application signal based upon the EADI metadata information for the application.

At 312, the receiving unit presents a user interface (UI) which informs a user based upon the received application signal.

At 314, the receiving unit receives and acts upon user input via the UI.

Computer-Executable Instructions

An implementation of an exemplary application-signal generator and manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary application-signal generator and manager may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer storage media, wherein the media is not a signal, having processor-executable instructions that, when executed by a processor, performs a method comprising:
   receiving from a content provider, by head-end equipment using an extended asset definition interface from a content provider, a digital television (DTV) application and its associated metadata, wherein the extended asset definition interface specifies a data structure including the DTV application and metadata attributes consisting of:
      an application identifier field for identifying the DTV application;
   an originator identifier field for identifying an originator of the DTV application;
   an application-type field for indicating a type of the DTV application and specifying a runtime environment needed to run the DTV application;
   a profile field for indicating a minimum profile of a system on which the DTV application will execute;
   a visibility field for indicating the degree of control a user has over the DTV application;
   a permission field for denoting "sandbox" security permission of the DTV application; and
   a rating field for indicating a rating of the DTV application;
   generating, by the head-end equipment, an application information table for conveying application signaling information to a DTV receiving unit, the application information table being generated based on the associated metadata;
   generating, by the head-end equipment, a content referencing identifier for the DTV application;
   registering, by the head-end equipment, an authority record with an authority to enable the DTV receiving unit to resolve the content referencing identifier;
   generating, by the head-end equipment, a data grouping having the application information table and the content referencing identifier;
   sending, by the head-end equipment, a transmission to the DTV receiving unit, wherein such transmission comprises the data grouping, whereby the application signaling information is used by the DTV receiving unit to discover and launch the DTV application,
   wherein the head-end equipment, the content provider, and the DTV receiving unit are each separate and distinct from each other, and
   wherein the extended asset definition interface is defined to correspond to information that an application signaling generator of the head-end equipment needs to generate the application information table.

2. A computer storage media, wherein the media is not a signal, as recited in claim 1, wherein the method further comprises storing, by the head-end equipment, the DTV application and its associated metadata.

3. A computer storage media, wherein the media is not a signal, as recited in claim 1, wherein the method further comprises constructing and formatting, by the head-end equipment, a DTV data service transmission which comprises the DTV application.

4. A method for managing digital television (DTV) application signaling, the method comprising:
   receiving from a content provider, by head-end equipment using an extended asset definition interface, a digital television (DTV) application and its associated metadata, wherein the extended asset definition interface specifies a data structure including the DTV application and metadata attributes comprising:
      an application identifier field for identifying the DTV application;
      an originator identifier field for identifying an originator of the DTV application;
      an application-type field for indicating a type of the DTV application and specifying a runtime environment needed to run the DTV application;
      a visibility field for indicating the degree of control a user has over the DTV application; and
      a rating field for indicating a rating of the DTV application;
   wherein the metadata drives data insertion equipment at the head-end equipment;
   constructing and formatting, by the head-end equipment, a DTV data service transmission which comprises the DTV application;
   generating, by the head-end equipment, an application information table for conveying application signaling information to a DTV receiving unit, the application information table being generated based on the associated metadata;
   generating, by the head-end equipment, a content referencing identifier for the DTV application;
   registering, by the head-end equipment, an authority record with an authority to enable the DTV receiving unit to resolve the content referencing identifier;
   generating, by the head-end equipment, a data grouping having the application information table and the content referencing identifier; and
   application-signaling, by the head-end equipment, the DTV receiving unit via a transmission comprising the data grouping,
   wherein the head-end equipment, the content provider, and the DTV receiving unit are each separate and distinct from each other, and
   wherein the extended asset definition interface is defined to correspond to information that an application signaling generator of the head-end equipment needs to generate the application information table.

5. A method as recited in claim 4, further comprising provisioning transmission bandwidth, by the head-end equipment, to transmit periodically the application signaling information built for the metadata.

6. A method as recited in claim 4, wherein the metadata attributes further comprise:
   a profile field for indicating a minimum profile of a system on which the DTV application will execute; and
   a permission field for denoting "sandbox" security permission of the DTV application.

7. A digital television (DTV) application management system implemented in head-end equipment comprising:
   an asset receiver configured to receive, using an extended asset definition interface, a digital television (DTV) application and its associated metadata from a content provider, wherein the extended asset definition interface specifies a data structure including the DTV application and metadata attributes comprising:
      an application identifier field for identifying the DTV application;
      an originator identifier field for identifying an originator of the DTV application;
      an application-type field for indicating a type of the DTV application and specifying a runtime environment needed to run the DTV application;
      a visibility field for indicating the degree of control a user has over the DTV application; and
      a rating field for indicating a rating of the DTV application;
   a content referencing identifier (CRID) generator configured to generate a CRID for the DTV application;
   a registration authority record generator configured to register an authority record with an authority to enable the DTV receiving unit to resolve the content referencing identifier;
   an application signaling generator configured to generate an application information table for conveying application signaling information to a DTV receiving unit, the application information table being generated based on the associated metadata, and to generate a data grouping having the application information table and the CRID;
   a transmitter configured to send a transmission to the DTV receiving unit, wherein such transmission comprises the data grouping,
   wherein the head-end equipment, the content provider, and the DTV receiving unit are each separate and distinct from each other, and
   wherein the extended asset definition interface is defined to correspond to information that the application signaling generator needs to generate the application information table.

8. A system as recited in claim 7, wherein the metadata attributes further comprise:
   a profile field for indicating a minimum profile of a system on which the DTV application will execute; and
   a permission field for denoting "sandbox" security permission of the DTV application.

* * * * *